United States Patent [19]
Cowley

[11] 3,895,100
[45] July 15, 1975

[54] PRODUCTION OF CHLORINE DIOXIDE
[75] Inventor: Gerald Cowley, Mississauga, Canada
[73] Assignee: Erco Industries Limited, Islington, Canada
[22] Filed: July 5, 1973
[21] Appl. No.: 376,380

[52] U.S. Cl. ............... 423/478; 423/499; 423/504; 423/520; 423/552; 252/187; 23/282
[51] Int. Cl. ..................... C01b 11/02; C01b 7/02
[58] Field of Search .......... 423/477, 478, 479, 480, 423/499, 504, 520, 552

[56] References Cited
UNITED STATES PATENTS
| | | | |
|---|---|---|---|
| 2,863,722 | 12/1958 | Rapson | 423/478 |
| 3,341,288 | 9/1967 | Partridge et al. | 423/478 |
| 3,563,702 | 2/1971 | Partridge et al. | 423/478 |
| 3,793,439 | 2/1974 | Rapson | 423/478 |

*Primary Examiner*—Edward Stern
*Attorney, Agent, or Firm*—Sim & McBurney

[57] ABSTRACT

A chlorine dioxide-producing process and apparatus therefor are provided in which water vapour is used to dilute and remove the chlorine dioxide from the reaction vessel. A cyclic arrangement is provided in which the recycle liquid heated to the boiling point of the reaction medium in the generator is allowed to expand gradually to provide a vapour/liquid/solid mixture which is discharged at low velocity to the generator. Vibration due to boiling is considerably reduced and wear of generator walls due to impinging materials is eliminated.

6 Claims, 2 Drawing Figures

PRODUCTION OF CHLORINE DIOXIDE

FIELD OF INVENTION

This invention relates to the production of chlorine dioxide.

BACKGROUND TO THE INVENTION

Chlorine dioxide is utilized in a variety of bleaching operations, particularly in the bleaching of cellulosic fibrous material, such as, wood pulp produced by the Kraft and sulfite processes.

Chlorine dioxide is known to be prepared in a variety of ways, involving the reduction of an alkali metal chlorate, generally sodium chlorate, in an acid solution utilizing sulphur dioxide, sulphuric acid, chromic sulphate, methanol, sodium chloride or hydrochloric acid as reducing agents. The basic reaction in all such processes is that between chlorate and chloride in the acid solution to produce chlorine dioxide, chlorine and water, in accordance with the equation:

$$2H^+ + ClO_3^- + Cl^- \rightarrow ClO_2 + \tfrac{1}{2}Cl_2 + H_2O$$

When sodium chloride or hydrochloric acid is the reducing agent, then chlorine is produced along with the chlorine dioxide. In the presence of other reducing agents, part of the chlorine is reduced to chloride in the reacting solution so that the chlorine dioxide produced contains lesser amounts of chlorine.

The acid medium may be provided by sulphuric acid where the reducing agent is sodium chloride, and may be provided both by sulphuric acid and hydrochloric acid where the reducing agent is hydrogen chloride. The acid medium may be wholly provided by hydrogen chloride also acting as the reducing agent.

In Canadian Pat. No. 825,084, there is described a process of forming chlorine dioxide and chlorine from an alkali metal chlorate, an alkali metal chloride or hydrogen chloride or mixtures thereof, and sulphuric acid, in which chlorine dioxide and chlorine are generated and an alkali metal acid sulphate is crystallized in the same reaction zone. Water is evaporated from the reaction medium to remove the chlorine dioxide and chlorine from the reaction zone.

The alkali metal usually is sodium and the form of the acid sulphate product is dependent on the temperature and acidity of the reaction medium. At high acidities around 10 to 12 N and at temperatures of around 75° to 100°C, the sodium acid sulphate is in the form of sodium bisulphate ($NaHSO_4$). The reaction involved is represented by the equation:

$$NaClO_3 + NaCl + 2H_2SO_4 \rightarrow 2NaHSO_4 + ClO_2 + \tfrac{1}{2}Cl_2 + H_2O.$$

At lower acidities, around 5 to 9 N and lower temperatures of around 30° to 70°C, sodium sequisulphate ($Na_3H(SO_4)_2$) is formed. The reaction involved is represented by the equation:

$$3NaClO_3 + 3NaCl + 4H_2SO_4 \rightarrow 3ClO_2 + 3/2Cl_2 + 3H_2O + 2Na_3H(SO_4)_2.$$

In Canadian Pat. No. 826,577, there is described a process of preparing chlorine dioxide and chlorine by reacting sodium chlorate, sodium chloride and sulphuric acid under conditions of low acidity, generally of the order of 2 to 4.8 N. This process may be performed in a single reaction zone in accordance with the process of the above-mentioned Canadian Pat. No. 825,084, evaporating water from the reaction medium to remove the chlorine dioxide and chlorine, and generally precipitating anhydrous sodium sulphate ($Na_2SO_4$) in the reaction zone.

The reaction involved in this latter process is represented by the following equation:

$$NaClO_3 + NaCl + H_2SO_4 \rightarrow ClO_2 + \tfrac{1}{2}Cl_2 + H_2O + Na_2SO_4$$

In all the above-described reactions there is a competing reaction in which no chlorine dioxide is formed represented by the equation:

$$NaClO_3 + 5NaCl + 3H_2SO_4 \rightarrow 3Cl_2 + 3Na_2SO_4 + 3H_2O.$$

This reaction becomes significant when the mole ratio of chloride to chlorate in the reactor feed substantially exceeds 1:1. In order to maximize production of chlorine dioxide from chlorate, it is preferred to operate the above process at approximately equimolar or slightly higher molar ratio of chloride to chlorate in the feed.

Another process for the production of chlorine dioxide is described in Canadian Pat. No. 913,328 in which hydrochloric acid forms the acid medium and the reducing agent. The process, when sodium chlorate is reduced, is represented by the equation:

$$NaClO_3 + 2HCl \rightarrow ClO_2 + \tfrac{1}{2}Cl_2 + NaCl + H_2O.$$

In the processes described in the above-mentioned Canadian patents, the evaporation is carried out at the boiling point of the reaction medium under a reduced pressure to deposit product alkali metal sulphate or alkali metal chloride in the reactor and the liquid level in the vessel generally is maintained at a substantially constant level by balancing the water added with that evaporated. The evaporated water acts as diluent gas for the generated chlorine dioxide and chlorine and removes the gaseous products from the reaction vessel.

The present invention is directed to chlorine dioxide processes in which water is evaporated from the reaction vessel to act as diluent for the chlorine dioxide and in which solid alkali metal salt is deposited in the reaction zone. Preferably, the process is one of those described in the above-mentioned Canadian Pat. Nos. 825,084; 826,577 and 913,328.

The reaction vessel may be of any convenient design and usually includes a cylindrical body with a conical base. A conduit for removal from the vessel of solid product in a slurry with some reaction medium communicates with the conical base. Solid material is removed from the slurry and make-up chemicals are added to the remaining material before recycle to the reaction vessel. The recycling liquid is heated in a heat exchanger, typically to substantially the boiling temperature of the solution under the prevailing conditions of the reaction vessel, prior to discharge to the reaction vessel.

The process of the invention is described hereinafter particularly with reference to reduction of an alkali metal chlorate with an alkali metal chloride or a mixture of an alkali metal chloride and hydrogen chloride in a sulphuric acid containing medium. Preferably, the alkali metal chlorate is sodium chlorate and the alkali metal chloride is sodium chloride.

In conventional evaporator practice in which a liquid is evaporated in a vessel, a slurry is removed, solid is recovered and liquid is recycled and reboiled during recycle, the liquid is prevented from boiling in the recycle line by operating the vessel with the level of liquid above the entry point of the recycled liquid a height greater in hydrostatic head than the increase in saturated vapour pressure caused by the temperature rise across the recycle loop heater.

However, in the chlorine dioxide-producing processes used in the present invention, since there is reaction to form chlorine dioxide upon addition of sulphuric acid to the recycling chemicals in the recycle loop it is not possible to have the level of liquid in the reaction vessel above the discharge point of the recycled liquid. The recycled material therefore is discharged above the level of the liquid in the reaction vessel.

The velocity of the liquid in the recycle loop and discharging to the reaction vessel above the liquid level therein must be maintained above a predetermined minimum value to prevent boiling of the liquid in the heat exchanger and to prevent vibration due to flashing flow acceleration. This minimum velocity is high and as a result the discharging material may impinge on the opposite wall of the vessel. Due to the solids content of this material, the vessel wall is subject to wear by the impinging material.

SUMMARY OF INVENTION

The present invention is concerned with modifying the recycle operation in order to avoid wear to the vessel walls, while at the same time achieving satisfactory recycle and reaction efficiency. In the present invention, boiling in the liquid from the recycle loop heater is allowed to develop gradually while maintaining acceleration at a low level, prior to discharge to the reaction vessel. In this way, it is possible to discharge recycled material to the reaction vessel at low velocity while vibration due to flashing flow acceleration is minimized.

Generally, the sulphuric acid is added to the recycled liquid containing residual amounts of solid material as well as make-up amounts of sodium chlorate and reducing agent downstream of the heat exchanger. To prevent the formation of local "hot spots" upon dilution of the acid it is usual to employ sulphuric acid which has been diluted to approximately 50% w/w. The present invention enables substantially concentrated sulphuric acid to be used without formation of hot spots.

DESCRIPTION OF PREFERRED EMBODIMENTS

Figure 1:
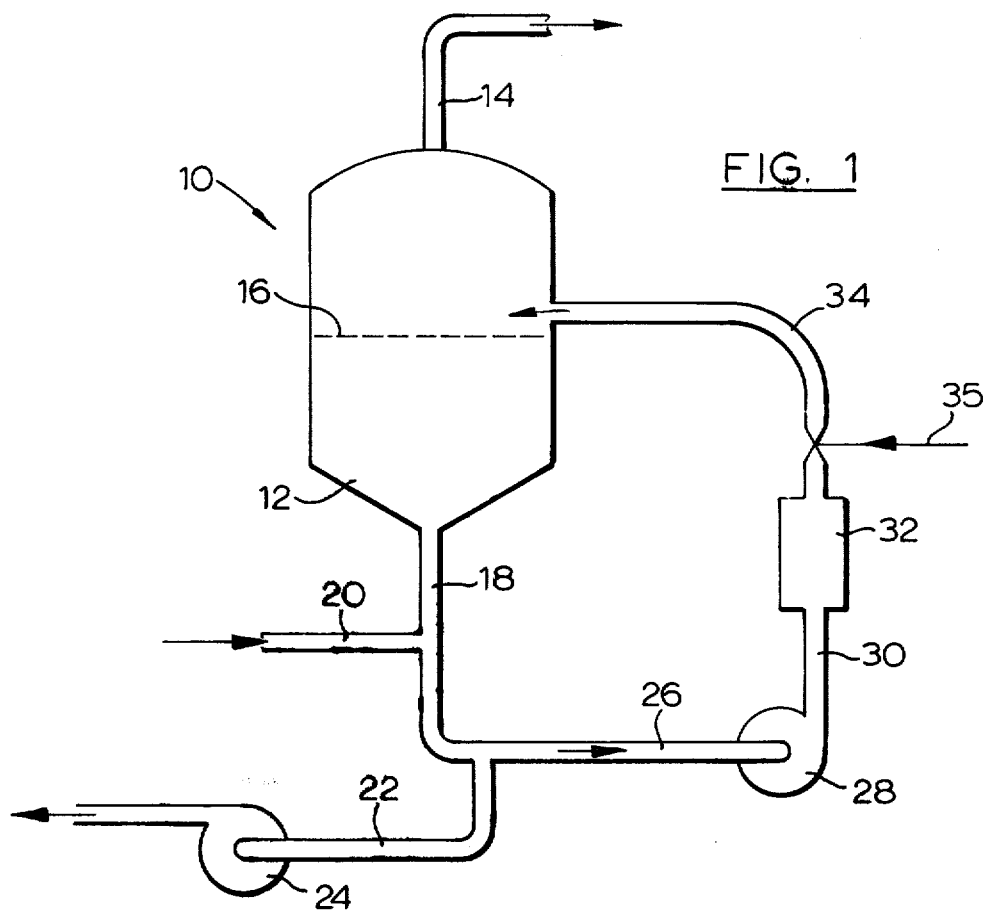
FIG. 1 is a schematic representation of a reactor modified in accordance with one embodiment of the invention.

In the drawings, a chlorine dioxide generator vessel 10 of diameter $D_o$ contains a reaction medium 12 which is aqueous sodium chlorate, sodium chloride and sulphuric acid maintained at its boiling point under a reduced pressure. A mixture of sodium chloride and hydrogen chloride may be used, if desired, in which event the quantity of sulphuric acid may be lowered, with the hydrogen chloride providing the remainder of the acid. The quantity of sodium sulphate produced per unit of chlorine dioxide thereby is reduced. The hydrogen chloride may be used to provide all the reducing agent and up to half the acid requirement. Chlorine dioxide, chlorine and water vapour are formed and are removed from the generator 10 as a gaseous mixture by line 14. The chlorine dioxide may be recovered from the gaseous mixture in any convenient manner.

The liquid level 16 is maintained substantially constant during chlorine dioxide production, by control of the evaporation of water from the reaction medium 12 and the addition of water with the make-up chemicals.

Sodium sulphate is deposited from the reaction medium 12 and a slurry of product sodium sulphate and reaction medium is withdrawn by line 18 from the generator 10. The form of the sodium sulphate depends on the reaction conditions in the reaction medium 12. Make-up quantities of aqueous solution of sodium chlorate and sodium chloride are added to the slurry by line 20 and solid sodium sulphate is removed from the resulting mixture by line 22 through pump 24.

Figure 2:
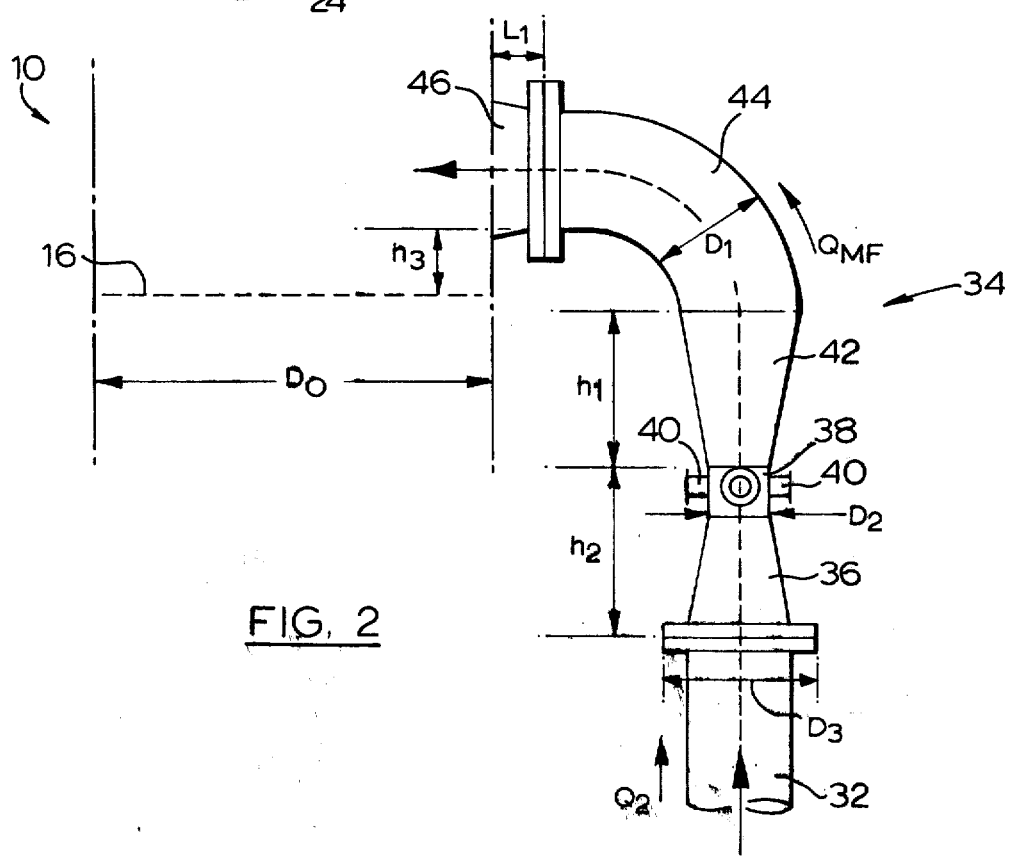
FIG. 2 is a close-up view of part of the apparatus of FIG. 1.

The solution of sodium chlorate and sodium chloride containing some solid unremoved sodium sulphate remaining after removal of the solid material through line 22 is passed by line 26 through pump 28 and line 30 to a reboiler 32. In the reboiler 32 the solution is heated to the boiling point of the reaction medium 12 under the prevailing conditions of the generator 10 and is forwarded by line 34 to the generator 10. The point of entry of the feed from line 34 to the generator 10 is a distance $h_3$ (see FIG. 2) above the liquid level 16 in the generator 10. The form of line 34 is illustrated in FIG. 2 and described in more detail below. Sulphuric acid is fed by line 35 to the solution in line 34 so that chlorine dioxide begins to form in line 34 by reaction between the materials in this line.

As seen in detail in FIG. 2, the line 34 includes a first frusto-conical portion 36 of length $h_2$ and of reducing cross-sectional area in the direction of flow of the liquor of flow rate $Q_2$ from a diameter $D_3$ at the reboiler and terminating in a collar 38 of diameter $D_2$. Sulphuric acid inlet tubes 40 in communication with line 35 are spaced around the collar 38. There are four such inlet tubes 40 provided in diametrically opposed pairs, the pairs being at right angles to each other. Any desired number and orientation of such inlet tubes may be provided. The collar generally is of short length sufficient only to allow the addition of sulphuric acid by inlet tubes 40.

A second frusto-conical portion 42 of length $h_1$ and of increasing cross-sectional area downstream from the collar 40 from a diameter $D_2$ at the collar 40 to diameter $D_1$. The second frusto-conical portion 42 terminates in a continuously curved pipe or elbow 44, which may be a five-section pipe, of substantially uniform diameter $D_1$ through which material flows at a rate $Q_{MF}$. The curved pipe 44 terminates at its downstream end in communication with an inlet flange 46 on the generator 10, the inlet flange 46 having a length $L_1$.

Thus, liquid leaving the reboiler 32 first is accelerated to a high velocity in the first frusto-conical portion 36 of the line 34. The first frusto-conical portion 36 is dimensioned so that the back pressure caused by the acceleration of the liquid in the first frusto-conical portion 36 exceeds the difference in saturation vapour pressure of the liquid present and of that of the generator 10. Preferably, the compression section length $h_2$ is approximately 2.5 times the diameter $D_2$. For the temperature rise designed for in the reboiler 32, the liquor height equivalent to the rise in saturation vapour pressure thereacross may be designated S. If it is assumed that there is no energy loss in the height $h_2$, then $$S 32 V_w^2/2g - V_x^2/2g + h_2$$

where $V_w$ is the velocity of the liquor in the collar 38 and $V_x$ is the velocity of the liquor at the exit of the reboiler 32. But, $h_2 = 2.5\ D_3$
and $$V_x = (D_2/D_3)^2\ V_w\ ,$$

and hence $$S = V_w^2/2g - V_x^2/2g + 2.5\ D_3$$

and, therefore, since S is known $V_w$ may be calculated and thence diameter $D_2$.

In this way, boiling of recycling liquid in the boiler 32 is avoided and hence the possibility of clogging of the reboiler tubes with solid deposit is reduced. In effect, the first frusto-concial portion 36 of tube 34 acts in the same manner as the hydrostatic head above the recycle feed in a conventional evaporator as described above.

The sulphuric acid in line 35 fed to the liquid in the collar 38 may be and preferably is concentrated (approximately 98%) sulphuric acid. This is in contrast to the prior art use of 50% w/w sulphuric acid. By utilizing a line 34 of the structure illustrated in FIG. 2, it is possible to introduce high concentration sulphuric acid into the recycle liquid without the formation of "hot spots." The sulphuric acid is fed rapidly into the collar 38 through the inlet tubes 40. Due to the speed of motion of the liquid in the collar 38 and the sulphuric acid, a rapid mixing of the materials occurs in the liquid phase. The strong acid is added to the accelerated heated mixture substantially at its maximum velocity in view of the acceleration in the first frusto-conical portion 36.

By using concentrated sulphuric acid, it is possible to avoid the use of the dilution techniques required in prior art operations to achieve a concentration of sulphuric acid of 50% w/w. Further, the quantity of water introduced into the system is reduced and hence the heat required to evaporate sufficient water to maintain the substantially constant liquid level 16 is reduced. Additionally, the full heat of dilution of the concentrated sulphuric acid is realized and hence a further thermal economy is effected.

The mixture then is expanded at the low acceleration in the second frusto-conical portion 42 of the line 34 so that boiling of the liquid and gaseous product release is brought about evenly and gradually.

Since the liquid commences to boil and chlorine dioxide starts to form in the collar 38, the material in the pipe 44 is mainly gaseous with amounts of liquid and solid suspended therein.

The velocity of the vapour/solid/liquid mixture in the pipe 44 is quite low, typically about 35 to 40 ft/sec. and hence as the liquid enters the generator 10 it does not impinge on the opposite wall of the generator, but rather discharges into the reaction medium 12. If it is assumed that there is no slip flow in the pipe 44 and a velocity of about 40 ft/sec. in the pipe 44 is utilized, then the velocity $= 40 = Q_{MF}/(\pi D_1^2/4)$ ,
and thus:

$$Q_{MF} = 31.41\ D_1^2$$

$(D_o + L_1)$ is the maximum length of horizontal path of the material entering the generator 10 from the pipe 44 if there is no impingement of this material on the generator wall, and $(h_3 + D_1)$ is the maximum height of the trajectory of the discharged material into the reaction medium 12. Thus, $$(h_3 + D_1) = \tfrac{1}{2}\ gt^2$$

$$(D_o + L_1)/t = 40,$$

and hence $$h_3 + D_1/16.1 = (D_o + L_1/40)^2$$

Hence, for any given set of conditions a minimum value for $D_o$ may be determined which permits the discharge of a vapour/solid/liquid mixture from the pipe 44 into the generator 10 without impingement of the material on the walls of the generator 10. In actual practice, the simplification of no-slip flow in the pipe 44 often does not occur and, due to vapour separation in the pipe 44 and in the trajectory into the generator 10, a value of 60% of the minimum diameter $D_o$ calculated from the above equation has been found acceptable.

By allowing boiling of the liquid to develop gradually in the second frusto-conical portion 42 while maintaining acceleration at a low level, hydrostatic head and flashing are balanced, thus vibration and high frictional pressure drop are avoided. All the gaseous material is assumed to be flashed from the liquor at the commencement of pipe 44. The second frusto-conical section 42 should be as long as possible to allow the gradual development of the boiling of the liquid at low acceleration without causing undue vibration, although layout considerations dictate the practical limits of length $h_1$.

Detailed mathematical relationships for the second frusto-conical section 42 are difficult to arrive at and require solution of the momentum equation over incremental lengths of the section 42:

$$-\Delta P = G_T^2/2g\ [2\ (X_{g2}/\rho_{g2} - X_{g1}/\rho_{g1}) + 4FL/\rho_{(NS)}\ _D]$$

wherein $-\Delta P$ is the pressure drop across an incremental section, $G_T$ is the total flow, $X_{g2}$ is the fraction of vapour at the downstream end of the section 42 and $X_{g1}$ is the fraction of vapour at the upstream end and $\rho_{g2}$ and $\rho_{g1}$ are the specific gravities at those locations, F is the fanning fraction factor, L is the length of the incremented section, D is the diameter and $\rho_{(NS)}$ is the specific gravity at the incremental section assuming no slip.

Typically, a minimum length of 4 feet 6 inches is used where the volume of steam flashed off is around 4,000 lbs/hr.

In a typical operation, the velocity of the liquid leaving the reboiler 32 is about 11 ft/sec., that in the collar 38 is about 15 to 16 ft/sec. and that in the pipe 44 is about 36 ft/sec.

In contrast, in a chlorine dioxide-producing operation omitting the line 34 of the form shown in FIG. 2 but instead utilizing a conduit of uniform diameter, then due to flashing flow the velocity of the liquid in the feed conduit to the generator is about 100 ft/sec.

It will be apparent, therefore, that the present invention provides a method and apparatus for chlorine dioxide production which is a substantial improvement over the art, reducing wear of generator walls, allowing the use of reboilers without causing undue vibration and allowing concentrated sulpuric acid to be employed as an additive.

Modifications are possible within the scope of the invention.

What I claim is:

1. A continuous method of producing chlorine dioxide which comprises continuously maintaining a chlorine dioxide-producing reaction medium in a reaction zone, the reaction medium containing an alkali metal chlorate, a reducing agent capable of reducing said alkali metal chlorate to chlorine dioxide and chlorine and a strong mineral acid, continuously generating chlorine dioxide and chlorine from said reaction medium and continuously evaporating water from said reaction medium at substantially the boiling point thereof while the reaction medium is maintained under a reduced pressure continuously removing from said reaction zone a gaseous mixture consisting of said generated chlorine dioxide and chlorine and said evaporated water, continuously recovering chlorine dioxide from said gaseous mixture, continuously depositing in said reaction zone an alkali metal salt of the anion of said strong acid, continuously removing from said reaction zone a slurry containing deposited alkali metal salt and part of said reaction medium, continuously forming a recycle mixture having a reduced alkali metal salt solids content and containing make-up quantities of alkali metal chlorate and reducing agent, heating said recycle mixture substantially to an elevated temperature which is the boiling point of said reaction medium at the prevailing absolute pressure in said reaction zone, accelerating the heated mixture to establish a back pressure to exceed the difference in saturation vapour pressure of the heated mixture and of said reaction medium, adding strong mineral acid to said accelerated heated mixture substantially at the maximum velocity of said mixture resulting from said acceleration to provide a feed material for said reaction zone, allowing gaseous material in said feed material to expand while maintaining a low rate of acceleration feeding said expanded feed mixture to said reaction zone at a level above the liquid level in said reaction zone, and maintaining the level of liquid in said reaction zone substantially constant.

2. The method of claim 1 wherein said alkali metal chlorate is sodium chlorate.

3. The method of claim 1 wherein said reaction medium contains sodium chlorate, sodium chloride and sulphuric acid.

4. The method of claim 1 wherein said reaction medium contains sodium chlorate, hydrochloric acid and sulphuric acid.

5. The method of claim 1 wherein said reaction medium contains sodium chlorate and hydrochloric acid.

6. The method of claim 1 wherein said strong mineral acid is sulphuric acid and is added to said accelerated heated liquid in substantially concentrated form.

* * * * *